May 29, 1956     H. A. QUIST     2,747,601

PRESSURE RESPONSIVE LIQUID SUPPLY FOR BREATHER VALVE

Filed Nov. 24, 1954     2 Sheets-Sheet 1

*INVENTOR.*
HAROLD A. QUIST

BY Robert O. Spindle
ATTORNEY

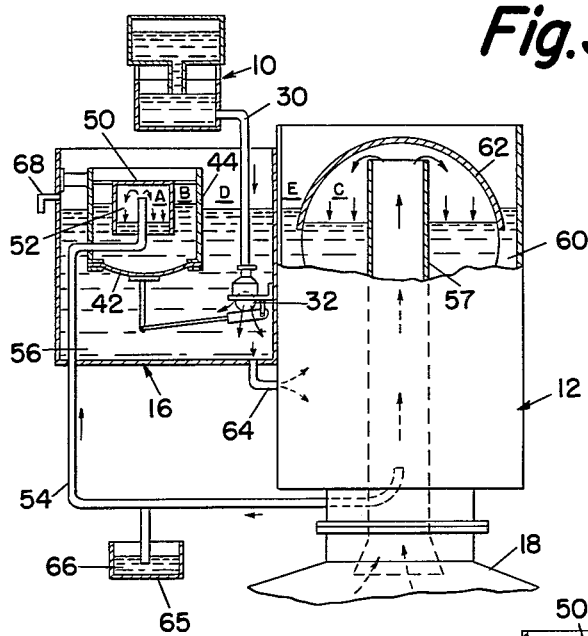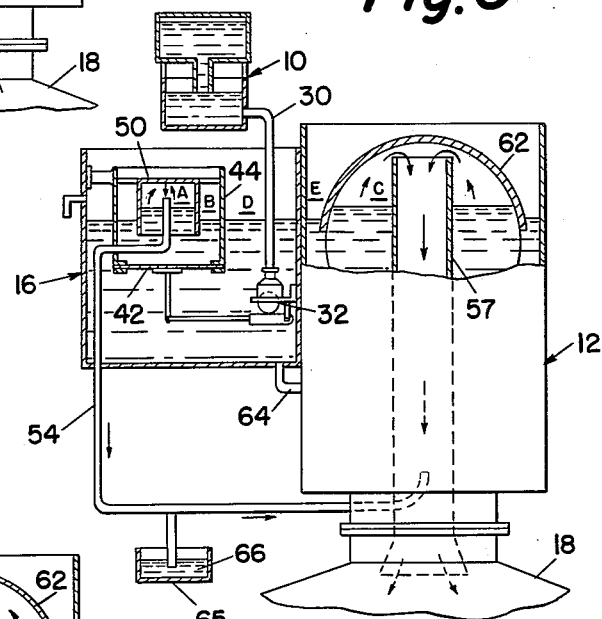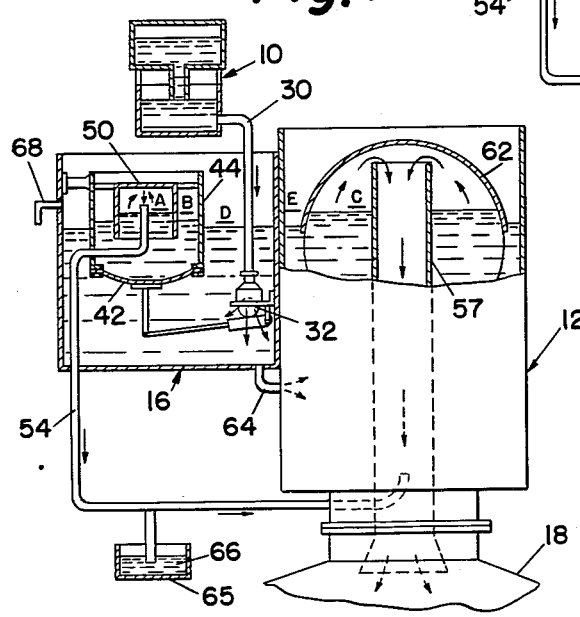

United States Patent Office 2,747,601
Patented May 29, 1956

2,747,601

PRESSURE RESPONSIVE LIQUID SUPPLY FOR BREATHER VALVE

Harold A. Quist, Swarthmore, Pa., assignor to Sun Oil Company, Philadelphia, Pa., a corporation of New Jersey Application November 24, 1954, Serial No. 471,035

7 Claims. (Cl. 137—253)

This invention relates in general to liquid-sealed reciprocating pressure relief valves and more particularly to pressure responsive reservoirs adapted to maintain the sealing liquid at operating level relative to the valve member.

It is a primary object of this invention to provide a reservoir for liquid sealed valves cooperating with pressure-vacuum sources, which will maintain an exact liquid level in the valve member chamber under all operating conditions. Such a valve, with which the device of this invention is especially useful, is described and claimed in my copending application Serial Number 415,659, filed March 11, 1954. A broader application will be evident, however, to those versed in the art.

It is well known to control the supply of liquid to operating elements by means of float mechanisms responsive to the rise and fall of the liquid body surrounding those elements. Such a replenishing means is subject to clogging by ice and gum, and requires constant check to detect leaks in the float when a hollow body is used. Further, the dimensions and material of such a float must be carefully selected with reference to the specific gravity of the liquid with which it cooperates. Also the accurate functioning of float mechanisms under conditions of pressure variations in which a range of pressures above and below atmospheric is effective, requires complex elements and special provisions. It is, therefore, a further object of this invention to provide a simplified reservoir means for maintaining the liquid seal in a valve chamber at the proper operating level.

In accordance with the present invention the liquid sealed valve of the type shown in the application of reference is supplied from a reservoir through a system of pressure responsive operating chambers. An operating chamber supporting a diaphragm is positioned in the body of the sealing liquid to submerge the diaphragm under all operating conditions. In this instance a liquid transfer chamber is added to the valve of reference to extend the sealing liquid body to receive the operating chamber. A liquid body, separate from the sealing liquid, fills the operating chamber to the level of the sealing liquid under non-operating conditions. An inverted pressure cup, in sealing engagement with the liquid in the operating chamber, receives the valve operating pressure from the attended source. By proportioning the exposed areas of the liquid in the device as supported by the operating chamber and the valve chamber and the portions covered by the valve member and the inverted pressure cup, a proportionate response of depth to pressure effect is obtained. The diaphragm of the operating chamber, subject to this depth differential of the enclosed and surrounding liquids, is connected to control the supply of sealing liquid from the reservoir. Thus the proper quantity of liquid about the valve member is assured under all pressure conditions.

The invention lies in the features of construction, combination and arrangement of parts, subsequently fully detailed and claimed, in which description reference is made to the figures of the drawing as follows:

Figures 2 through 7 are schematic sketches, partially broken away, of the operation of the device under various pressure conditions attended by the valve mechanism.

Figure 1:
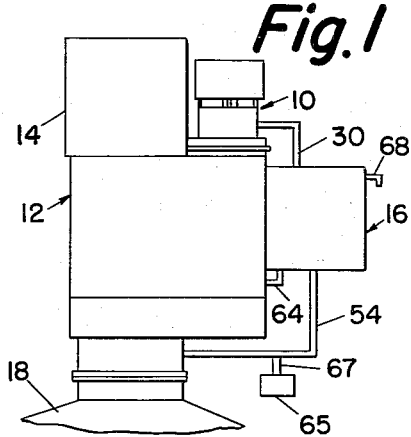
Figure 1 is an elevational view of the typical liquid sealed valve in the application of reference to which has been added the contrivance of this invention.

It will be noted that there is a difference between Figure 1 and the remaining figures relative to the physical location of the separate elements of the sealing liquid supply combination. In Figure 1, the reservoir generally denoted by the numeral 10 is positioned on the valve chamber 12 adjacent the venting hood 14. The application of reference, Serial No. 415,659, will show that this is a logical place to put the liquid supply and that the transfer chamber 16 is also most conveniently placed as shown in this figure. To those versed in the art, it will be evident that this transfer chamber is an expedient to gain sufficient room in the valve chamber 12 for use of necessary elements later to be described. Also it enables the assembly of a separate device to be added to valves such as referred to here, rather than requiring it to be built into the valve chamber by costly reconstruction. Each of the remaining figures, as is evident, rearranges these elements relative to the valve chamber 12 to facilitate describing the operating liquid elevations as affected by the pressure and vacuum conditions of the storage tank 18 on which the relief valve is mounted.

A detailed description of the elements of the device and the necessary parts of the relief valve combination affecting the reservoir assembly will be given in reference to Figure 2. All these parts of the combination are reproduced in each of the succeeding figures and are present, with slight rearrangement as already stated, in Figure 1.

Figure 2:
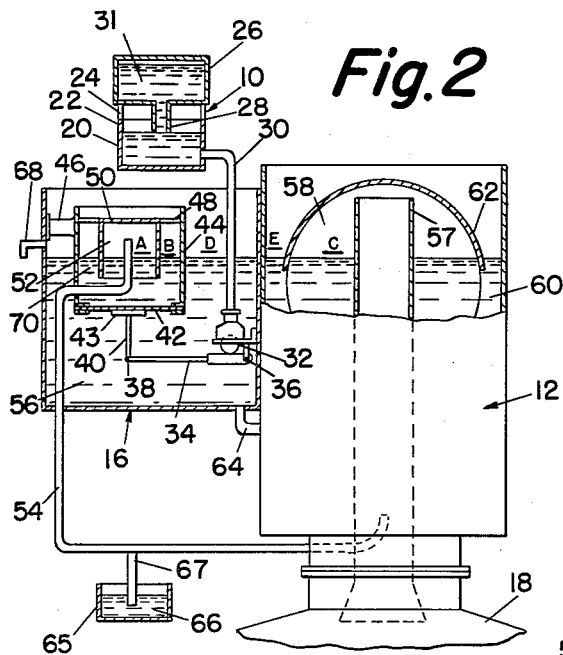

The reservoir 10 as shown in Figure 2 includes a lower compartment 20 with a body portion 22, apertured at 24, standing to support an upper, sealed compartment 26. By inverting the filling aperture 28 of compartment 26 after sealing liquid 30 is poured into it a regulated level of this liquid is constantly maintained in lower compartment 20. This involves a well known principle of liquid feeding vessels and is used here to increase the available supply of liquid and keep substantially constant the pressure of the hydraulic head on the supply valve which normally attends a tall column of liquid.

Extending downwardly from compartment 20 into transfer chamber 16, conduit 30 terminated by the ball check supply valve 32 forms the means of moving the liquid to the locus of use. A simple lever arrangement shown here as a rod 34 pin-hinged at 36 and 38 and supported by rod 40 connected to diaphragm 42 forms the valve 32 operating means. Float 43, preferably of foam-glass or like material, is designed to support the weight of these diaphragm connected levers and keep valve 32 closed in the non-operating position. Diaphragm 42 is peripherally fixed to operating chamber 44 permanently mounted in transfer chamber 16 as by brackets 46. Both the liquid transfer chamber 16 and the diaphragm supporting operating chamber are vented to atmosphere, which is shown diagrammatically in these figures as being freely open to atmospheric effects.

Inside the diaphragm supporting operating chamber 44 and held in fixed position relative thereto as by the spider 48, an inverted cup 50 is submerged sufficiently to form a continuous pressure space 52 above the level of the liquid 70 in chamber 44. A pressure transfer conduit 54 extends through the transfer chamber 16 and the body of sealing liquid 56 in this chamber, partially supporting the diaphragm chamber 44, and terminates in the inverted pressure cup 50 above the liquid level.

On its other end pressure transfer conduit 54 is let into the pressure vent flue 57 arcing upwardly as shown, the reason for which will be explained later. Thus it transfers the pressure of the vapor space of the storage vessel 18 and the pressure in the volume 58 above the sealing liquid 60 in valve chamber 12 under the reciprocable valve member 62 to space 52 in inverted cup 50. At a low portion of the pressure transfer conduit 54 a condensate receiving vessel 65 is shown. This vessel is open to admit atmospheric pressure to the body of liquid 66 which is in sealing engagement with a short conduit 67 connected to conduit 54. The length of the conduit connector 67, depth of immersion and quantity of liquid in addition to volume size of the vessel 65 are all regulated by the strength of the pressure and vacuum forces required to be handled by the subject valve. It is necessary that the vessel 65 function only to receive condensate from conduit 54 and not interrupt operations by permitting sealing liquid 66 to enter the conduit. The liquid used is normally glycol and water, although any liquid or mixture of liquid which will not freeze or explode is usually acceptable. The movement of liquid between the transfer chamber 16 and the valve chamber 12 takes place through conduit 64, and any appreciable quantity of liquid exceeding operating level escapes through an overflow such as is shown at 68. This overflow is placed at the maximum height of interrupted pressure to prevent release of liquid at normal operating levels.

As the operation of the above-described device depends on the difference in liquid heights of those liquid bodies affecting the diaphragm 42 as they rise and fall in response to pressure, vacuum and atmospheric conditions, it will be apparent that the areas of liquid subject to these pressure conditions are required to bear a definite relation to each other. This relationship involves the liquid areas in both valve chamber 12 and transmission chamber 16. The total area of liquid in these two chambers subject to atmospheric pressure is denoted as areas D and E. Area C, under valve 62, is directly affected by this area $D+E$. Separated, however, from this area $(D+E)$ is the separate liquid volume 70 in diaphragm chamber 44, which, in turn, is divided into two areas A and B. The area A under the inverted cup 50 duplicates area C under valve 62, while area B subject to atmospheric pressure bears a direct relationship to area $D+E$. In order to operate correctly, the differential head of liquid actuating the diaphragm must reflect the effect of the storage vessel pressure (or vacuum) under the valve member 62 relative to the elevation of the liquid in the valve chamber 12 outside the valve member. In order to clarify this relationship of areas, the areas are lettered A, B, C, D and E. Arranged as a mathematical expression this relationship of proportional areas reads $A:B::C:(D+E)$. That is: the area A of liquid in inverted cup 50 is to the area B of the liquid externally of that cup and within the diaphragm support chamber 44, as the area C of liquid under the rotatable valve member 62 is to the entire area $D+E$ of liquid exposed to atmospheric pressure found in the sum of the areas in the transfer chamber 16 outside the diaphragm chamber and in the valve chamber outside the valve. These latter areas D and E are to be considered together as one area in the proportionate expression. The same area-indicating reference letters are applied to Figs. 2 to 7 inclusive to facilitate the explanation of the operation. They remain constant at all times.

Figure 3:
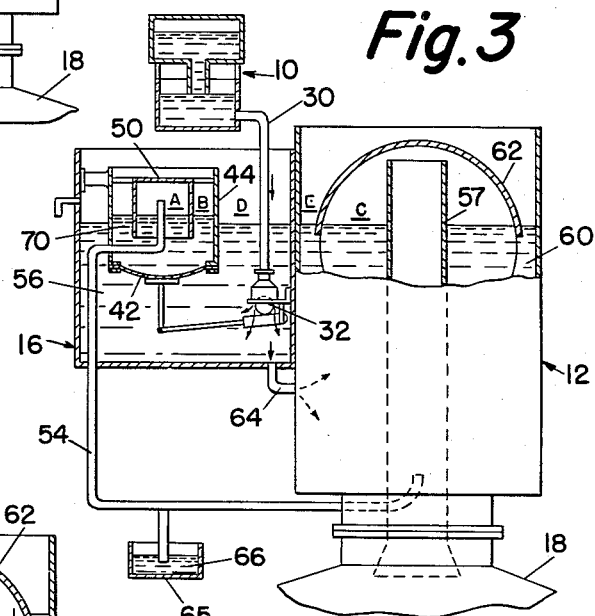

The elements as above defined in describing Figures 1 and 2 will be considered in operation as illustrated in the schematic Figures 2 to 7 inclusive. These six figures are generally divided into several different situations facilitating description. As the device is dependent on the pressure existing in the storage vessel 18 as transmitted through conduit 54 and relief flue 57, this is the basic condition on which the several operating positions are based. Figures 2 and 3 consider the condition of atmospheric pressure in the storage vessel, Figures 4 and 5 cover the pressure condition above atmospheric, while Figures 6 and 7 depict the vacuum condition or pressure below atmospheric.

In considering the action of the liquid level control elements in these three separate conditions of pressure, including all variations necessary, only two possible conditions of liquid supply in the valve chamber are discussed. As any excess of liquid is the unusual condition rather than a normal occurrence, and such condition is met by draining off the unnecessary amount through the overflow 68, it will be recognized that operation under such a condition would never occur and need not be discussed further. The conditions to be maintained, namely operating level, and failure to meet this requirement by insufficient sealing liquid in the valve chamber under operating conditions, are the important considerations and will be discussed in detail.

Figures 2 and 3, showing operating conditions where atmospheric pressure exists in the storage vessel 18, distinguish between the sufficiency and insufficiency of the volume of sealing liquid, respectively. As there is sufficient liquid in Figure 2, and no pressure unbalance, diaphragm 42 is in normal position, valve 32 closed, and there is no flow of liquid required from the reservoir 10 to the transfer chamber 16.

An insufficiency of sealing liquid is considered in Figure 3, the internal storage vessel pressure remaining at atmospheric. Such a condition could arise, for example, immediately after venting a pressure condition from the storage vessel, where a quantity of sealing liquid is entrained in the outwardly moving gases, and is not recovered. The reservoir must supply this deficiency to maintain satisfactory valve operating characteristics.

By reference to the schematic figures of the drawing it will be evident that the areas of the liquid bodies exposed to the operating pressures remain constant. In addition to these fixed areas, the volume of liquid 70 in the diaphragm supporting container is constant, its function depending on its effective depth relative to the depth of liquid 56 surrounding it in transfer chamber 16. The unchanging volume of liquid 70 in the diaphragm supporting operating chamber is selected with a specific gravity the same or very close to the sealing liquid 56 to eliminate any requirement for correction in the structure of the diaphragm 42 or operating characteristics of valve 32.

Returning to Figure 3, the volumes of liquid 56 and 60 in the transfer chamber 16 and valve chamber 12 respectively are reduced below operating level as required by our problem. The pressure in the storage vessel 18 is given as equal to atmospheric, thereby eliminating differences of pressure in this first operating condition. The liquid levels both inside and outside inverted pressure cup 50 are equal, both being subject to atmospheric pressure. Therefore the only difference in this figure from that shown in Figure 2 is the difference in height between liquid height of volume 70 and liquid height of volume 56. As both liquids are of equal specific gravity, this greater height of liquid 70 forces the diaphragm downwardly operating valve 32, causing additional sealing liquid to flow from reservoir 10 through valve 32 into the transfer body of liquid 56 for distribution to the valve chamber 12 through conduit 64. When sufficient liquid has been released through valve 32 to raise the levels represented by $D+E$ and C to equal that of A and B, the hydraulic pressures on diaphragm 42 are balanced and the elements resume the position shown in Figure 2, closing liquid inlet valve 32.

Figure 4:
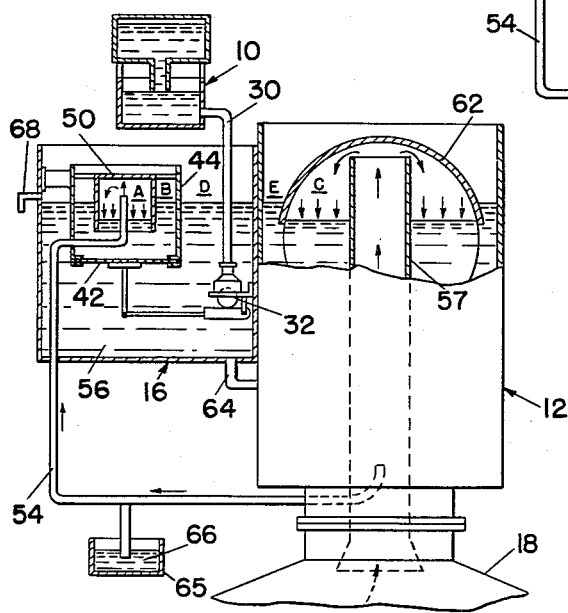

Figures 4 and 5 illustrate these two conditions where an excessive pressure, above atmospheric, exists in the storage vessel 18. Figure 4 considers the effect of this pressure condition on the apparatus where there is sufficient liquid in the valve chamber, while Figure 5 shows the effects where there is not sufficient liquid, and more must be supplied. Such condition arises, for example, where liquid is being pumped into storage or an increase in temperature increases the volume of the volatiles by expanding the gaseous volumes. However created, the increased pressure becomes effective on areas A and C both of which are enclosed. Area A under inverted cup 50 is acted upon by pressure transmitted from storage vessel 18 through conduit 54. At the same time, this same pressure effect is transmitted through vent flue 57 to exert force on area C as outlined by valve member 62.

The effect of this pressure unbalance is proportionate in both the reciprocating valve chamber and the diaphragm support chamber because of the proportionate areas affected. Area A under inverted cup 50 is depressed in an amount proportionate to area C under valve 62 relative to the atmosphere exposed areas B and $D+E$ respectively. Exerting downward pressure on diaphragm 42 is a head of pressure equal to the transmitted storage vessel pressure plus the static head of liquid pressured from surface A to the upper side of the diaphragm. Within the diaphragm supporting chamber 44, this pressure head is balanced by the column of liquid measured from surface B downwardly to the upper side of diaphragm 42 plus atmospheric pressure effective on area B. This then measures the total effective static pressure head working on the upper side of the diaphragm. Supporting the diaphragm from below is an opposing force, equal to the downwardly operating pressure in this case as no liquid replacement is needed, comprising the atmospheric pressure plus the pressure of the depth of liquid in the transfer chamber 16 above the diaphragm level up to the level of surface established by areas D and E. Any change in this balanced condition either forces liquid out the overflow 68, or opens valve 32 accepting liquid from reservoir 10.

Figure 5 illustrates the condition where pressure above atmosphere exists in the storage receptacle and there is insufficient liquid depth for a proper seal about valve member 62. The sealing liquid requirement is indicated by the cooperating surfaces D and E, being slightly below area B causing the hydraulic pressure differential resulting in diaphragm 42 moving downwardly to open valve 32. When sufficient sealing liquid is admitted from reservoir 10 to reestablish level D and E, with B, diaphragm 42 is balanced and returns to normal position permitting valve 32 to close.

In detail, this pressure condition, above atmospheric, under which the liquid seal supply system operates here, is transmitted from the storage receptacle to affect areas A and C as previously described. As understood by reference to the art describing the type of valve for which this supply system is intended, this storage receptacle pressure is the operating pressure for the valve. Consequently sealing liquid must be supplied when needed, notwithstanding pressure, and, as will be seen later, vacuum as well.

As described above, the need of liquid replacement is indicated by the difference in liquid levels in areas B, D and E. In the inverted cup, the excessive tank pressure has depressed area A and lifted area B to an equivalent pressure depth and established an operating level. This same pressure exerted under the valve on area C has depressed this area and lifted liquid elevation in areas D and E but not high enough to hydraulically balance diaphragm 42. The differential in hydraulic pressure heads operating on the diaphragm and maintained proportionally because of the proportionate areas, depresses the diaphragm to operate valve 32. After sufficient liquid drops from reservoir 10 to reestablish the pressure balance, the diaphragm levels and closes valve 32.

This condition of pressure relief and maintenance of the operating liquid seal level is the influencing factor for arcing the pressure transmitting conduit 54 upwardly where it enters relieving flue 57. Before the valve member 62 rotates to relieve the pressure condition, the total pressure of the storage tank 18 is effective in the space beneath both the valve and inverted cup 50. When the valve member releases the pressure, the flow of relieved gases passing through flue 57 around the upwardly curved end of conduit 54 creates a slight pressure drop at this end of the conduit proportionate to the velocity head of the moving gases. This effect is transmitted to inverted cup 50, space 52 minimizing an excessive pressure which would be built up were conduit 54 pointed in any other direction. The effect of excessive pressure would be to hold valve 32 open beyond the requirement and uselessly waste the sealing liquid. By upturning conduit 54 in flue 57 and utilizing the effect of the velocity head of escaping gases to reduce the pressure rather than increase it, this condition is avoided.

The remaining two figures 6 and 7 show the effect of a vacuum condition in receptacle 18 on the supply apparatus when, first, there is sufficent sealing liquid in valve chamber 12, and second, when additional liquid is needed for proper valve operation. Such a vacuum condition can be created by pumping out the stored liquid, or by decrease in temperature contracting the volatile components in the tank space. As explained above, the receptacle pressure condition, vacuum in this case, is transmitted to both the inverted cup 50 and below valve member 62 through conduit 54 and vent flue 57 respectively. Under these below atmospheric pressure conditions, the result is for the liquid heights in areas A and C to be forced to higher elevations by the effect of atmospheric pressure on areas B, D and E. However, on the premise that no liquid is needed for this case, pressures on both sides of the diaphragm must remain balanced in order to keep valve 32 closed.

By proportioning the respective areas as described above, change in the hydraulic head both in the valve chamber 12 and in the transfer chamber 16 are equal. As no additional liquid is needed, the vacuum condition in the valve member 62 and inverted cup 50 does not create a differential head affecting the diaphragm 42. Consequently valve 32 remains closed.

Where this vacuum condition exists and additional sealing liquid is required to reach the proper operating level, the device will operate as shown in Figure 7. The effect of vacuum in cup 50 causes atmospheric pressure effective on area B to lift the elevation of area A as shown. Area C, under valve member 62, is elevated, lowering areas D and E. Under the premise of insufficient liquid to seal valve 62, there is not a proportionate movement between areas B and $D+E$, resulting in an unbalanced hydraulic pressure head on the surfaces of diaphragm 42. The greater pressure being inside chamber 44, the diaphragm is forced downwardly, opening valve 32, admitting additional liquid. When sufficient liquid is supplied to raise the effective levels of C and $D+E$, pressure balance on the diaphragm is restored and liquid inlet valve 32 closed.

The operating conditions under which it is required to maintain a level of sealing liquid around a rotating liquid-seal breather valve have been considered. Under all conditions, where additional liquid is required to preserve the best operating characteristics of the valve, the described device will supply the liquid in proper amount. By initially filling the elements of the supply mechanism to the required operating level as considered in Figure 2, that level so established will be continued.

It will be evident that changes in structure such as extending the valve chamber to include the herein described transmission chamber can be made without affecting the spirit of the described invention. Such modification, and similar changes evident as mechanical rearrangements, is included in the inventor's comprehension of the device, and insofar as is possible, such are included in the claimed structure of the mechanism.

What is claimed is:

1. A sealing liquid supply device for use in combination with a liquid sealed pressure relief valve reciprocatively operable in the sealing liquid comprising in combination with the body of sealing liquid surrounding the valve member, a chamber supporting a diaphragm below the operating levels of said sealing liquid, operating liquid in the diaphragm supporting chamber normally level with the sealing liquid, an inverted pressure cup partially submerged in the liquid in the diaphragm supporting chamber, the liquid surface areas of the inverted pressure cup and the area of liquid in the diaphragm chamber being proportional to the surface areas under the reciprocal valve and the liquid externally of the valve and diaphragm chamber, a pressure transmitting conduit connecting the space above the liquid in the inverted pressure cup with the pressure source to be relieved, a reservoir to supply additional sealing liquid connected to the body thereof by a conduit having a regulating valve controlling the flow therethrough, and valve operating means linking said regulating valve to the diaphragm.

2. A sealing liquid supply device for use in combination with a liquid sealed pressure relief valve reciprocatively operable in the sealing liquid comprising a liquid transmission chamber adjacent said liquid seal extending the sealing liquid level therein, a chamber supporting a diaphragm below the operating levels of the liquid in the transmission chamber, operating liquid in the diaphragm supporting chamber normally level with the liquid in the transmission chamber, an inverted pressure cup partially submerged in the diaphragm supporting chamber liquid, the liquid surface areas of the inverted pressure cup and the area of liquid in the diaphragm chamber being proportional to the surface areas under the reciprocal valve and the sum of the liquid areas externally of the valve and diaphragm chamber, a pressure transmitting conduit connecting the space above the liquid in the inverted pressure cup with the pressure source to be relieved, a liquid exchange conduit connecting the transmission chamber with the liquid seal, a liquid supply above the transmission chamber connected thereto by a conduit having a regulating valve therein, and valve operating means linking said regulating valve to the diaphragm.

3. The device defined in claim 2 further characterized by the sealing liquid and the operating liquid in the diaphragm supporting chamber being substantially alike in specific gravities.

4. The device defined in claim 2 further characterized by the valve operating means linking the valve of the liquid supply conduit to the diaphragm including a plurality of lever arms connecting said valve to the diaphragm and a float supporting the diaphragm at the locus of the lever arm connections with a buoyancy equal to the weight of the lever arms and the hydraulic pressure of the reservoir on said valve thereby nullifying the gravity effect of said lever arms and the reservoir hydraulic pressure.

5. The device defined in claim 2 further characterized by the liquid supply above the transmission chamber including a combination of a lower receptacle open to atmospheric pressure, and an inverted, sealed upper vessel whereby the hydraulic head pressure on the valved conduit is kept substantially constant for accurate operation.

6. In combination with a reciprocating liquid-sealed pressure relief valve, flue connected to and adapted to transmit pressure and vacuum conditions from storage receptacles, a sealing liquid supply system responsive to the pressure conditions to be relieved comprising a liquid transmission chamber adjacent the relief valve positioned to support the operating liquid level of said valve therein, a reservoir of sealing liquid above said transmission chamber, a conduit connected therewith, a valve in the connecting conduit submerged in the liquid in said transmission chamber, an operating chamber supporting a diaphragm and adapted to contain a fixed volume of operating liquid, said operating chamber being positioned to keep the diaphragm submerged in the liquid of the transmission chamber at a depth to place the liquid therein on a level with the surrounding liquid under normal operating conditions, an inverted pressure cup in said operating chamber partially submerged in the operating liquid, the relative areas of the inverted pressure cup and the operating chamber being proportionate to the area covered by the reciprocating relief valve and the total area of sealing liquid externally of the operating chamber and said valve, a conduit connecting the relief valve flue connection to the pressure space in the pressure cup thereby transferring like actuating pressures to both the relief valve and the inverted cup, and valve operating means connecting the reservoir conduit valve and the diaphragm.

7. In combination with a liquid sealed pressure relief valve flue connected to and adapted to transmit pressure and vacuum conditions from storage receptacles, said valve including a reciprocating member mounted in a liquid supporting valve chamber in sealing relation; a reservoir system to maintain the level of the sealing liquid in said valve chamber comprising a transmission chamber positioned adjacent said valve chamber to support an additional body of sealing liquid in extension of that in the valve chamber; a diaphragm support chamber in said transmission chamber positioned to maintain the diaphragm submerged in the liquid therein; a separate body of liquid in said diaphragm support chamber of a specific gravity substantially equal to that of the submerging liquid surrounding the diaphragm; an inverted cup in said diaphragm chamber maintained in constant pressure retaining relationship with the liquid body therein, the area of liquid covered by said inverted cup being proportional to the area of liquid in the diaphragm support chamber in the same ratio as the liquid area under the reciprocating valve is to the remaining area of liquid in the valve chamber and the transmission chamber externally of the diaphragm chamber; a pressure conducting conduit extending from the flue connection of the valve to the inverted cup; a liquid transmitting conduit connecting the valve chamber and the transmission chamber below the lowest operating level of the liquid contained therein; a reservoir to supply additional liquid above the transmission chamber, a conduit connecting said reservoir to the transmission chamber, valve means in said conduit, and a valve operating lever operably connecting the diaphragm and the valve opening and closing said valve in response to diaphragm movement.

References Cited in the file of this patent

UNITED STATES PATENTS

| | | |
|---|---|---|
| 998,068 | Barker | July 18, 1911 |
| 1,612,777 | McCabe | Dec. 28, 1926 |
| 2,591,098 | Quist | Apr. 1, 1952 |